United States Patent Office 3,851,076
Patented Nov. 26, 1974

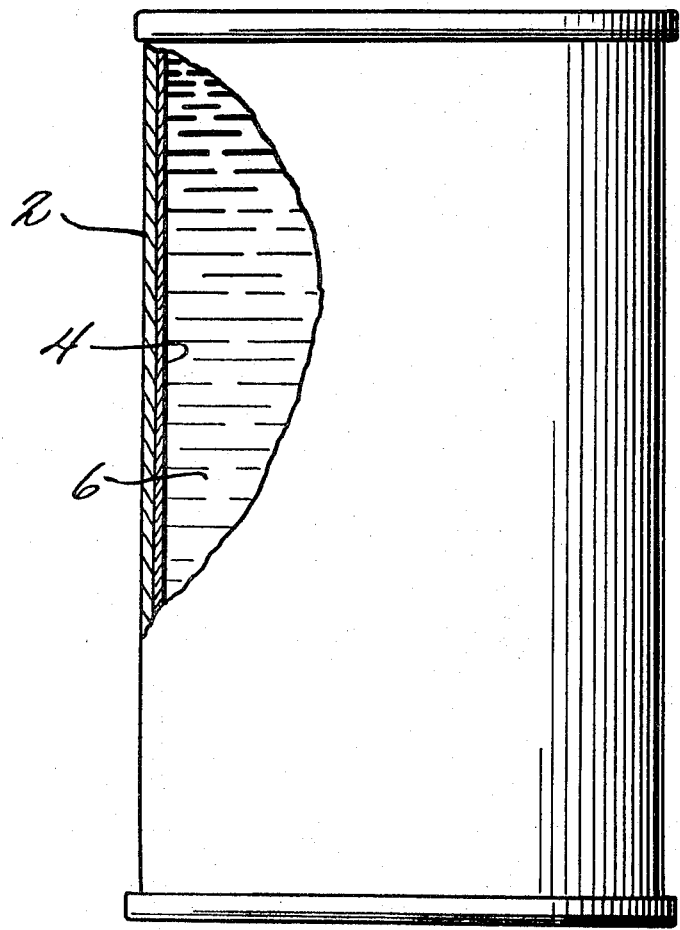

3,851,076
LIQUID FOOD PRESERVATION
Akira Okuhara, and Masatoshi Saiki, Noda, and Nobuo Saito, Nagareyama, Japan, assignors to Kikkoman Shoyu Co., Ltd., Noda Noda-shi, Japan
Original application Mar. 6, 1970, Ser. No. 17,059. Divided and this application Sept. 11, 1972, Ser. No. 287,809
Claims priority, application Japan, May 30, 1969, 44/41,653; Dec. 19, 1969, 44/101,612; Oct. 18, 1968, 43/75,591
Int. Cl. A23b 7/00; A23l 1/02
U.S. Cl. 426—262                      7 Claims

ABSTRACT OF THE DISCLOSURE

A process for improving and maintaining the quality of liquid foods by inhibiting or preventing the formation of melanoidins or decolorizing melanoidins formed in liquid foods by contacting said liquid foods with a metal such as Mg, Al, Mn and Zn and optimally removing the metal after said treatment.

This is a division of application Ser. No. 17,059 filed Mar. 6, 1970.

The present invention relates to a process for improving quality of foods and maintaining quality of liquid foods in the course of preservation and storage. More particularly, the present invention relates to a process for decolorizing melanoidins formed in the course of the production and storage of foods and inhibiting the formation of the melanoidins, and to a container for liquid foods which is capable of inhibiting the formation of the melanoidins.

The term "liquid foods" in the present invention signify liquid foods such as, for example, soy sauce, amino acid solution, wines and fruit juices; foods consisting of fruits and liquor such as syrup; or foods, a portion of which is liquor.

Ingredients of liquid foods are generally complicated and various chemical reactions are caused by oxygen contained in air or temperature, one of the most unfavourable reaction is browning caused after products are made. Reactions with respect to the browning include the so-called "oxidative browning reaction" in which oxygen contained in air participates and a non-oxidative browning reaction in which oxygen does not participate. Both the two are not favourable and particularly, the former is high in reaction velocity and results in remarkable deterioration in quality by oxidation.

There have heretofore been studied a process for decolorizing abnormal coloring caused by melanoidins formed in the course of the production of liquid foods and a process for preventing the formation of melanoidins in the course of preservation of packed foods, particularly for preventing the formation of melanoidins caused by oxidative browning reaction. And a portion thereof has been practised, but any of such processes is not satisfactory as a process for decolorizing the melanoidins or preventing the production of the same. Further, in the case of the so-called "canned foods" which use tin-cans, a large amount of tin is dissolved out into liquid foods with the progress of oxidation by oxygen in air and oxidants in the foods itself, and toxic problem is often caused thereby. Therefore, the settlement of the dissolving-out of tin has been desired both by user's side and maker's side. In the case of tin-cans having a small amount of plated tin, the tin at the inside surface of the cans is almost dissolved to expose iron plate of the can and the iron itself is dissolved out into foods. And thus, the contents absolutely lose a value as foods in some cases.

The processes for decolorizing melanoidins formed in the course of production or storage of the liquid foods before packing are almost limited to a process for the absorption-decolorization by the use of adsorbents such as active carbon, Japanese acid clay, decolorizing resin and the like.

These adsorbents, however, have such drawbacks of requiring much trouble and expense that scents of foods other than color are also adsorbed, a large amount of adsorbents should be used, the separtion of adsorbents after treatment is difficult, the regeneration operation of used adsorbents is required, and the like. Furthermore, these absorbents are not able to be used for decolorization of the liquid foods containing solid materials such as pulp in juice. It goes without saying that these absorbents can not reduce the liquid foods.

In the case of packed foods, there often comes into the question the deterioration in quality in the course of storage or use which is caused by oxidation of air in the upper section of a container enclosed together with liquid foods at the time of being packed in the container or by the oxidation of air at the time of being opened. Especially, a plastic container made of polyvinyl chloride and the like which has recently been much used has a certain gas permeability in general and results in the marked deterioration in quality by oxidation as compared with containers made of metals and glass. Further, in the tin-cans, the tin face is remarkably corroded and the dissolving-out of toxic tin ions causes a difficult problem in food sanitation.

Even in the tin-cans, there are available cans coated further with lacquers in their inside surface under the object of preventing the dissolving-out of the tin. In this kind of containers, however, tin or silver is contained in the inside coated film or tin is partially exposed on the inside surface for preventing the oxidation of foods contained and the reduction in flavour. These means are scarcely effective or in consequence, the tin is much dissolved out into foods.

It has been considered that a certain kind of metal ions inhibits the browning of foods. For example, Japanese Pat. No. 234,666 discloses that, when a metal having a smaller ionization tendency than that of iron such as silver, tin or the like or a compound (oxide) thereof is put in an internally coated film of tin-cans, the browning of foods contained therein is prevented but a metal having a larger ionization tendency than that of iron such as, for example, aluminum or its compound (oxide) has no such effect at all. From the process for producing tin-cans coated in their inside surfaces disclosed in said Patent, it is understood that a metal having a larger ionization tendency than that of iron did not bring about the effect in itself since the metal is changed to oxide thereof or the surface of metal is changed to a strong oxidized coating in the course of baking at 200° C. for 15 minutes.

Further, there have been available as known antioxidants sulfurous acid, cysteine, ascorbic acid and the like. These compounds, however, are little in effect and if used to the extent of being effective, they impair the flavour and become toxic. And even when the effect is brought about, they accelerate reversely the browning after the lapse of a certain time. Therefore, the addition of antioxidants is not satisfactory as a process for stabilizing the quality.

An object of the present invention is to provide a process for decolorizing melanoidins formed in liquid foods.

Another object of the present invention is to provide a process for preventing the deterioration in quality due to the oxidative browning reaction and the oxidation of packed foods.

A further object of the present invention is to provide a process for inhibiting the dissolving-out of tin (Sn) in liquid foods packed in tin-cans.

A still further object of the present invention is to provide a container capable of inhibiting the formation of melanoidins and the dissolving-out of tin (Sn).

As a result of various studies, the present inventors have found that a color of liquid foods, namely a coloring matter which is a factor of color-change substances in soy sauce, amino acid solution, Mirin, fruit juices and the like and is a main cause of the so-called melanoidins which have been known to be formed by the amino-carbonyl reaction and the oxidation with oxygen can be decolorized by contacting with a certain kind of metals such as, for example, Al, Mn, Zn, Mg and the like and that the oxidative browning reaction and non-oxidative browning reaction can be inhibited by said contact. Further, it has been found in the case where liquid foods are kept in tin-cans that the amount of dissolving-out of tin can be remarkably reduced by disposing said metal to a portion or the whole of the inside surface of the can so as to contact with liquid foods.

The process for improving quality of liquid foods and the process for preserving liquid foods in accordance with the present invention comprise contacting a metal such as aluminum or the like with the liquid foods.

The first embodiment of the present invention is a process for the decolorizing by contacting said metal with liquid foods containing melanoidins. If required, said metal may be removed after the decolorization.

The second embodiment of the present invention is a process for preventing the deterioration in quality of liquid foods due to the inhibition of the oxidative and non-oxidative browning reaction by packing the liquid foods in a container having the inside surface on which one kind or more of the metals are disposed in advance partially or wholly to contact the liquid foods with the metals.

The third embodiment of the present invention is a container comprising a vessel and a metal or more selected from the present metals, the metal being disposed on the inside surface of the vessel, whereby the oxidative or non-oxidative browning reaction in liquid foods can be inhibited.

The fourth embodiment of the present invention is a process for preventing the deterioration in quality of liquid foods due to the inhibition of browning reaction and the inhibition of dissolving-out of tin by packing the liquid foods in a tin-can having the inside surface on which one kind or more of the metals are disposed partially or wholly to contact the liquid foods with the metals.

The fifth embodiment of the present invention is a tin-can having the inside surface on which the metal is disposed.

As the metals which prevent the browning by contacting them with the liquid foods, there can be used a metal in Groups I, IIa, IIb, III and VIII in the Periodic Table. Among them, magnesium, aluminum, manganese and zinc are effective for attaining the object of the present invention.

Particularly, a metal to be disposed on the inside surface of tin-can for preventing the dissolving-out of tin is necessary to be a metal having a larger ionization tendency than that of tin, namely a metal more readily reactive with air or an oxidizing substance in the liquid foods than tin. As the metals corresponding to such requirement, there can be enumerated metals shown in Table 1. However, cobalt, nickel, thallium, cadmium and iron are not preferred because they are very low in the effect of preventing the dissolving-out of tin. The metals which can be used in the present invention are those having a larger ionization tendency than that of iron. As these metals, there are enumerated metals which are harmless in food sanitation and gradually react with mixed air or an oxidizing substance in liquid foods to show a strong reductive power even in an extremely slight amount and maintain the effect for a long period of time, such as, for example, aluminum, zinc, magnesium, manganese and the like (metals having electrolytic dissociation voltages named in Table 1). Among them, the most preferable metals are aluminum and zinc.

TABLE 1

| E° volt | E° volt | E° volt |
| --- | --- | --- |
| Li—3.05 | Mg—2.37 | Cd—0.40 |
| K—2.93 | Al—1.66 | Tl—0.34 |
| Ba—2.90 | Mn—1.18 | Co—0.28 |
| Ca—2.87 | Zn—0.76 | Ni—0.25 |
| Na—2.71 | Fe—0.44 | Sn—0.14 |

The present invention will be further explained in detail being divided into a process for decolorizing the melanoidins by the use of the present metals, a process for preventing the deterioration in quality of liquid foods by contacting with the present metals and a container to be used for said object.

A. A PROCESS FOR DECOLORIZING MELANOIDINS

Liquid foods containing melanoidins are put in an adequate container, and the present metals are added thereto to contact them with the liquid foods and the resultant are allowed to stand unil reaching the objective color or for the objective period, or liquid foods are contacted with the metal by applying an adequate means such as stirring and shaking. At that time, the container may be of open type, but is preferable to be of a sealed type filled up with nitrogen gas and the like. The amount of metal to be consumed is varied depending upon the kind of liquid foods, the amount of melanoidins and the like, but the amount of dissolving-out thereof into the liquid foods does not exceed ca. 400 p.p.m. in maximum.

When reached the objective color or after the lapse of the objective period, the remaining metal is, if required, removed by the treatment such as filtration and the like, and in the case where the co-existence of the metal ions is not preferred, it is necessary to remove then by an adequate means, for example, by the use of ion exchange resin and electrolysis. In many cases, however, the dissolving-out of the metal is slight in amount and the removal thereof is not required in almost all cases.

With respect to the shape of metals to be used, a preferable shape such a powder, foils, lump and plates may optionally be selected in accordance with the object. However, powder is the most preferable. By varying the kind of metals, the purity of metals, the pH of foods to be treated, the reaction temperature and the contact area, the reaction velocity can be regulated. When the reaction velocity is high, the foods are decolorized and when the same is low, there are brought about the prevention of the oxidation and browning and the inhibiting effect.

According to the present process, it is possible to lower the color of liquid foods to the objective color in a simple manner.

B. PROCESS FOR PREVENTING THE DETERIORATION IN QUALITY OF LIQUID FOODS AND CONTAINER THEREFOR

Process

This is a process for inhibiting the formation of melanoidins by disposing the present metal in an adequate amount on a portion or the whole of the inside surface of a container to contact with liquid foods, and the dissolving-out of tin is prevented thereby in the case where the container is a tin-can. In addition, the effect of preventing the dissolving-out of tin is of course brought about by disposing the present metal on the whole inside surface, and even if only a portion of the inside surface is disposed with the metal, namely tin directly contacts with the liquid foods, the sufficient effect can be brought about.

Container

This is a container for the preservation of liquid foods which comprising a vessel and the present metal, the metal being disposed on a portion or the whole of the inside surface with an adequate amount of the present metal so as to contact with the liquid foods.

The vessel to be used in the present invention may be those which are usually used as containers for preserving liquid foods such as, for example, glass containers, paper containers, plastic containers and tin-cans.

The necessary amount of metal to be disposed is varied depending upon the contents, the amount of air enclosed in a container and the like, but it is generally sufficient to be extremely slight (several tens p.p.m. to the amount of liquid foods). The area disposed with the present metal which contacts with the liquid foods is generally preferred to be more than 5 to 10 cm.² per 100 ml. of the contents. Further, in the case where a coating comprising a resin and the metal powder is made in accordance with the coating method, it is necessary to determine the contact area under the consideration of permeating and diffusion velocity of the liquid foods into the resin since the metal powders are present in the interior of the resin.

In the case where the metal is disposed to a container made of non-metallic materials such as glass and plastics, the metal is directly disposed to its inside surface, but in the case of metal-made containers, it may be disposed on a coating of non-metallic materials such as lacquers coated in advance on the metal face, or it may be directly disposed to the inside surface thereof.

The single figure of the drawing is a side elevation with parts broken away. Referring more specifically to the drawing, there is provided a tin can 2 having an inner aluminum coating 4. A liquid food 6 is packed in the container.

As the adhering methods, there are available an ordinary coating method of metal powder and the adhesion method of metal foils. Particularly, aluminum and the like may be adhered in accordance with the vaporization process. In the case of tin-cans, there are available a process for adhering metal powders or foils on a coating of a synthetic resin adhesive such as, for example, epoxy synthetic resin adhesives prepared on the inside surface of the containers and a metal plating process in addition to the vaporization process.

In addition, aluminum cans have been used as containers for liquid foods. However, in any case, metal aluminum does not directly contact with the liquid foods but the inside surface covered and protected by the oxidized film, namely alumite or lacquers, contacts with the liquid foods. In the case where the metal aluminum directly contacts with the liquid foods, the aluminum is gradually dissolved out because of being weak against acids, becomes thin partially or wholly, and is finally perforated to be unable to be used as the container. On the contrary, in the present invention, such drawback does not come into the question at all since only chemical effects of aluminum are utilized.

The liquid foods to be used in the present invention include seasonings such as soy sauce, amino acid solution and the like, fruit juices such as concentrated apple juice, orange juice and the like, wines such as white wine, and the like.

The present invention will be explained with reference to the following examples. In addition, a color intensity is determined by the absorbance at 500 m$\mu$ through a liquid layer of 10 mm. in thickness. Only in the case of soy sauce, the same is diluted by 10-folds to be treated. Further, controls are results of liquid foods without the addition of the present metal tested under the same condition.

EXAMPLE 1

300 ml. of raw soy sauce was put in a flask, 0.3 g. of metal powder was added thereto and the resultant was heated in nitrogen gas while stirring at 80° C. for 3 hours. After cooling, the resultant liquid was filtered to remove off an excess of metal. The absorbance of the resultant liquid was measured, the result of which is shown in Table 2.

TABLE 2

| Metal added: | Absorbance |
|---|---|
| Control | 0.724 |
| Magnesium | 0.638 |
| Aluminum | 0.602 |
| Zinc | 0.539 |

EXAMPLE 2

200 ml. of raw soy sauce was put in a flask, 0.2 g. of metal powder was added thereto, and the resultant was heated in nitrogen gas while stirring at 60° C. for 3 hours. After cooling, the resultant liquid was filtered to remove off an excess of the metal, and the absorbance thereof was measured, the result of which is shown in Table 3.

TABLE 3

| Metal added: | Absorbance |
|---|---|
| Control | 0.543 |
| Aluminum | 0.535 |
| Zinc | 0.415 |

EXAMPLE 3

200 ml. of concentrated apple juice was put in a flask, 0.2 g. of metal powder or foils were added thereto, and the resultant was heated in nitrogen gas while stirring at 60° C. for 3 hours. After cooling, an excess of the metal was removed. The result of measurement is shown in Table 4.

TABLE 4

| Metal added: | Absorbance |
|---|---|
| Control | 0.789 |
| Aluminum powder | 0.643 |
| Aluminum foils | 0.716 |

EXAMPLE 4

300 ml. of a concentrated apple juice and aluminum foils were put in and enclosed in a container made of polyvinyl chloride, and shaken at 30° C. for one week. Thereafter, the absorbance was measured, the result of which is shown in Table 5.

TABLE 5

| Area of aluminum foil [1] added (cm.²): | Absorbance |
|---|---|
| 0 | 1.457 |
| 50 | 1.330 |
| 100 | 1.300 |
| 150 | 1.279 |
| 200 | 1.235 |
| 250 | 1.163 |
| Initial color intensity | 1.278 |

[1] The area of aluminum foil was shown in sum of area of both the two faces.

EXAMPLE 5

Pasteurized soy sauce was subjected to the treatment in the same manner as in Example 4. The result is shown in Table 6.

TABLE 6

| Area of aluminum foil added (cm.²): | Absorbance |
|---|---|
| 0 | 0.887 |
| 50 | 0.634 |
| 100 | 0.618 |
| 150 | 0.611 |
| 200 | 0.613 |
| 250 | 0.613 |
| Initial color intensity | 0.774 |

EXAMPLE 6

300 ml. of soy sauce contained 0.01% (weight per volume) of metal powder was put in a container made of polyvinyl chloride, stored at 30° C. for one week, and then freed from an excess of the metal by filtration. The absorbance thereof was measured, the result of which is shown in Table 7.

TABLE 7

| Metal added: | Absorbance |
|---|---|
| Zinc | 0.990 |
| Aluminum | 0.982 |
| Control | 1.068 |
| Initial color intensity | 0.995 |

EXAMPLE 7

300 ml. of browned white wine was added with 50 cm.$^2$ of aluminum foil, put in a container having a volume of 300 ml. which is made of polyvinyl chloride, and shaken at 30° C. for one week. The result is as follows.

| | Absorbance |
|---|---|
| Initial color intensity | 0.549 |
| Color intensity after a week | 0.523 |

EXAMPLE 8

Adding 0.1% (weight per volume) of zinc powder to concentrated apple juice having an initial color absorbance of 1.254 and stirring the resultant mixture for 3 days, there was obtained the juice having a color absorbance of 0.668. The unreacted zinc powder was removed and the zinc content was measured to be 300 p.p.m. After electrolyzing the resultant liquid at 55 to 60 ma. for 2 hours by the use of platinum as an anode and mercury as a cathode, the zinc content was again measured to be 3 to 4 p.p.m. From said result, it was understood that almost all of zinc was removed.

EXAMPLE 9

1 g. of zinc powder was added to 1 litre of remarkably colored concentrated apple juice (color absorbance: 1.756), the resultant was stirred for 60 hours, and then the unreacted zinc powder was removed by filtration. The resultant color intensity was 0.888. Said decolorized liquid was passed through a column of 150 ml. in Dowex A.1 H$^+$ type. Zinc content in reduced liquid foods was 230 p.p.m. and that of treated with said column was 7.5 p.p.m.

EXAMPLE 10

Adding 40 cm.$^2$ in both face areas of aluminum foil to 1 litre of pasteurized soy sauce packed in a bottle and standing the resultant mixture at 30° C. for 2 months, there were carried out the measurement of color intensity and a sensory evaluation test. The result is as follows:

| | Absorbance |
|---|---|
| Initial color intensity | 0.817 |
| Preserved for 2 months after added with Al | 0.790 |
| Control (preserved for 2 months) | 0.864 |

SENSORY EVALUATION TEST

| | Flavour | Taste |
|---|---|---|
| Control | | |
| Al addition | 0.39 | 0.11 |
| Significant test | | |

The marking was made in such a manner that no difference between the two is represented by 0, the remarkable difference therebetween is represented by 5 and 4 stages are provided between them. Members of tester were 18 persons. The result showed that significant difference between the two was not found except for the color intensity.

EXAMPLE 11

Vinyl chloride synthetic adhesives were coated on the inside surface of a plastic container having a volume of 300 ml. in an area shown in Table 8 and aluminum powder was spread over the resultant surface. After drying and solidifying the coating, the aluminum powders not fixed thereon were removed by washing with water. Packing and sealing 300 ml. of soy sauce in the resultant container and standing at 30° C. for one month, there was measured the absorbance (initial absorbance: 0.780). The result is shown in Table 8.

TABLE 8

| Area adhered (cm.$^2$) | Absorbance | Area adhered (cm.$^2$) | Absorbance |
|---|---|---|---|
| Control (0) | 0.982 | 90.0 | 0.642 |
| 14.4 | 0.882 | 99.0 | 0.664 |
| 23.4 | 0.828 | 130.0 | 0.660 |
| 45.0 | 0.774 | 180.0 | 0.642 |

As is obvious from Table 8, aluminum has a remarkable preventing effect against the browning and particularly the contact area in the vicinity of 23.4 to 45.0 cm.$^2$ for 300 ml. of soy sauce preferred for maintaining the initial color intensity thereof.

EXAMPLE 12

A mixture prepared by dissolving 20% (weight by volume) of polystyrene in ethyl acetate and adding a small amount of aluminum powder to the resultant solution was coated on the inside surface of a plastic container having a volume of 300 ml., and dried and solidified. 300 ml. of concentrated apple juice was packed and sealed in the resultant container, stood at 30° C. for 15 days or 30 days, and then measured in the absorbance. (Initial absorbance: 0.674). The result is shown in Table 9.

TABLE 9

| Area coated (cm.$^2$) | 15 days | 30 days |
|---|---|---|
| Control (0) | 0.918 | 1.054 |
| 32.1 | 0.732 | 0.864 |
| 56.3 | 0.686 | 0.754 |
| 76.8 | 0.670 | 0.746 |

As is obvious from Table 9, the effect for inhibiting the browning made by the coating prepared by mixing aluminum powder is remarkable.

EXAMPLE 13

Aluminum foil was adhered on the inside surface of a vinyl chloride container having a volume of 300 ml. by an adhesive in an area shown in Table 10. 300 ml. of soy sauce was packed and sealed in the resultant container, stood at 30° C. for about one month, and then measured in the absorbance. (Initial absorbance: 0.990). The result is shown in Table 10.

TABLE 10

| Area adhered (cm.$^2$) | Absorbance |
|---|---|
| Control (0) | 1.146 |
| 30 | 1.010 |
| 50 | 0.912 |

As is obvious from Table 10, the effect for inhibiting the browning reaction made by the adhesion of aluminum foil was remarkable, and particularly such favourable result was obtained that the initial color concentration was approximately maintained by the adhesion of aluminum foil having an area of 30 cm.$^2$.

EXAMPLE 14

A mixture prepared by dissolving polystyrene in ethyl acetate in the same manner as in Example 12 and adding a small amount of zinc powder thereto was coated in an amount of about 50 cm.$^2$ (15 to 30 mg. calculated as zinc powder) on the inside surface of a plastic container having a volume of 300 ml., and then dried. 300 ml. of soya sauce was packed and enclosed in the resultant container, shaken at 30° C. for one week, and then measured in the absorbance. (Initial absorbance: 0.924). The result is shown in Table 11.

TABLE 11

| | Absorbance |
|---|---|
| Control | 0.964 |
| Zinc | 0.920 |

As is obvious from Table 11, the coating containing zinc powder had a remarkable effect for inhibiting the browning reaction and could prevent the deterioration in quality.

EXAMPLE 15

In the same manner as in Example 12, a mixture prepared by dissolving polystyrene in ethyl acetate and adding a small amount of zinc powder thereto was coated on the inside surface of a container so as to contact with liquid foods to be contained therein, and then dried and solidified. 300 ml. of soy sauce (initial absorbance: 0.924) was packed and sealed in the resultant container, stood at 30° C. for 28 days, and then measured in the absorbance. The result is shown in Table 12.

TABLE 12

| Area coated (cm.$^2$) | Absorbance |
|---|---|
| 75 | 1.004 |
| 150 | 0.978 |
| Control (0) | 1.060 |

As is obvious from Table 12, there was brought about a remarkable effect.

EXAMPLE 16

Aluminum foil adhered on the inside surface of a 6-l. can which was coated in advance with a lacquer in an area as shown in Table 13 so as to contact with soy sauce to be packed. 6 litres of soy sauce was put in the resultant container and allowed to stand at 30° C. 500 ml. of the soy sauce was taken out in every one week after the lapse of 17 days of said storage and the color intensity thereof was measured. (Initial absorbance: 0.818). The result is shown in Table 13.

TABLE 13

| Area adhered (cm.$^2$) | Preservation day | | | |
|---|---|---|---|---|
| | 17 | 21 | 28 | 35 |
| Control (0) | 0.924 | 0.931 | 1.010 | 1.024 |
| 50 | 0.924 | 0.918 | 0.982 | 1.004 |
| 75 | 0.912 | 0.912 | 0.950 | 0.964 |
| 100 | 0.894 | 0.900 | 0.956 | 0.970 |
| 200 | 0.888 | 0.882 | 0.924 | 0.938 |
| 400 | 0.844 | 0.850 | 0.850 | 0.864 |

As is obvious from Table 13, the adhesion of aluminum brought about such a favourable result as to be remarkable in the effect for inhibiting the browning reaction, to prevent the deterioration in quality and to be possible to approximately maintain the initial color intensity by the adhesion of aluminum foil having an area of 400 cm.$^2$.

EXAMPLE 17

20 or 30 cm.$^2$ of aluminum foil was adhered on the inside surface of a paper container having a volume of 1 litre so as to contact with soy sauce to be packed. 1 litre of pasteurized soy sauce was packed and sealed in the resultant container, allowed to stand and preserved at 30° C. for two months, and measured in the absorbance during that period. (Initial absorbance: 0.828). The result is shown in Table 14.

TABLE 14

| Area adhered (cm.$^2$) | After one month | After two months |
|---|---|---|
| Control (0) | 0.906 | 1.010 |
| 20 | 0.876 | 0.906 |
| 30 | 0.828 | 0.858 |

As is obvious from Table 14, the effect for inhibiting the browning reaction was remarkable and the deterioration in quality was possible to be prevented.

EXAMPLE 18

25 cm.$^2$ of adhesive was coated on the inside surface a glass container having a volume of 360 ml. so as to contact with a liquid to be packed and aluminum powder was placed thereon before said coating is dry. After drying and solidifying, aluminum powder which was not adhered thereon was removed by washing with water. 360 ml. of pasteurized soy sauce was packed and sealed in the resultant container, allowed to stand at 30° C. for two months, and then measured in the absorbance. (Initial absorbance: 0.774). The result is shown in Table 15.

TABLE 15

| | After one month | After two months |
|---|---|---|
| Control | 0.870 | 1.040 |
| Adhered with Al powder | 0.818 | 0.970 |

As is obvious from the above Table, the effect for inhibiting the browning was remarkable.

EXAMPLE 19

Two kinds of containers were prepared, one being prepared by coating synthetic resin adhesive on the inside surface of a tin-can (can for juice) having a volume of 200 ml., placing aluminum powder or zinc powder thereon before said coating is not dried and removing the metal powder which is not adhered by washing with water, and another being prepared by adhering aluminum foil on the inside surface of a tin-can (can for juice) having a volume of 200 ml. by the use of an synthetic resin adhesive.

Subsequently, 200 ml. of orange juice (802 ml. of concentrated orange juice 65° Brix, 19.5 g. of citric acid and 1.6 kg. of sugar are dissolved in water to obtain a volume of 15 litres) or pine juice (1.5 kg. of concentrated pine juice 60° Brix, 18 g. of citric acid and 1.25 kg. of sugar are dissolved in 9.8 litres of water) was packed and sealed in the resultant container, and preserved at 30° C. for three months.

Analytic results of amounts of tin contained in the juices at that time are shown in Table 16.

TABLE 16

| Kind of juice | Metal adhered | Area adhered with metal, cm.$^2$ | Sn concentration (mg/ml.) | | |
|---|---|---|---|---|---|
| | | | Initial | After 3 months | $\Delta$Sn |
| Orange juice | Control | 0 | 0.01 | 0.05 | 0.04 |
| | Al powder | 25 | 0.01 | 0.02 | 0.01 |
| Pine juice | Control | 0 | 0.06 | 0.15 | 0.09 |
| | Al powder | 9 | 0.06 | 0.11 | 0.05 |
| | do | 18 | 0.06 | 0.11 | 0.05 |
| | Al foil | 18 | 0.06 | 0.09 | 0.03 |
| | do | 27 | 0.06 | 0.09 | 0.03 |
| | Zinc powder | 35 | 0.06 | 0.10 | 0.04 |

Remarks.—Control shows the result of the tin-can itself. $\Delta$Sn signifies an amount of dissolving-out of tin during three months.

As is obvious from Table 16, the amount of dissolving-out of tin in the case of preserving the liquid in the container for liquid foods prepared in accordance with the present invention was remarkably reduced as compared with the control.

In addition, from the result of a sensory evaluation test of the foods contained, it was found that the foods preserved in the container of the present invention maintains the quality at the time of being packed as it is.

What is claimed is:

1. A process for preserving liquid foods which comprises decolorizing melanoidins in a liquid food by contacting the liquid food which is a melanoidin-containing liquid food selected from the group consisting of soy sauce, amino acid solution, mirin, wine and fruit juice with a metal consisting of Zn in powder or foil form in a container selected from the group consisting of a container made of glass, a container made of plastic, a container made of paper, a container made of metal coated with plastic and a container made of metal coated with lacquer.

2. A process for preserving liquid food according to claim 1, wherein the decolorization of melanoidins in liquid foods is carried out by adding Zn in powder or foil form into the liquid food to be contacted with the metal, and removing therefrom the remaining metal after said decolorization by filtration before packaging.

3. A process for preserving liquid food according to claim 1, wherein the decolorization of melanoidins in liquid foods is carried out by adding Zn in powder or foil form into the liquid food to be contacted with the metals and removing therefrom remaining metal by filtration and removing the metal ions formed in the liquid foods by an ion exchange resin after said decolorization before packaging.

4. A process for preserving liquid food according to claim 1 wherein the decolorization of melanoidins in liquid food is carried out by adding Zn in powder or foil form into the liquid food to be contacted with the metals and removing therefrom remaining metal by filtration and the metal ions formed in the liquid foods by electrolysis after said decolorization before packaging.

5. A process for preserving liquid food according to claim 1 wherein the decolorization of melanoidins is carried out by packing the liquid food in a container having an inside surface of a non-metallic substance on which Zn in powder or foil form is disposed to contact the liquid foods with the metals.

6. A process for preserving liquid foods according to claim 1, wherein the decolorization of melanoidins is carried out with stirring to contact the liquid food with the zinc.

7. A process according to claim 1, wherein the zinc is in powder form.

References Cited

UNITED STATES PATENTS

| | | | |
|---|---|---|---|
| 1,679,543 | 8/1928 | Rector | 99—181 R |
| 1,958,765 | 5/1934 | Perkins | 99—181 R X |
| 2,299,090 | 10/1942 | Hothersall | 99—181 R X |
| 2,366,850 | 1/1945 | Gardner | 99—181 R |
| 3,130,059 | 4/1964 | Fried et al. | 99—181 R |
| 3,136,468 | 6/1964 | Keller | 99—181 R |
| 3,227,562 | 1/1966 | Houghtaling et al. | 99—155 X |

OTHER REFERENCES

Ion Exchange Resins, Kunin, R., 2nd Edition 1959, pp. 112 and 297–298.

NORMAN YUDKOFF, Primary Examiner

D. H. SANDERS, Assistant Examiner

U.S. Cl. X.R.

426—327, 398